United States Patent
Mohideen et al.

(10) Patent No.: US 7,149,873 B2
(45) Date of Patent: Dec. 12, 2006

(54) METHODS AND APPARATUS FOR A DUAL ADDRESS SPACE OPERATING SYSTEM

(75) Inventors: Saleem Mohideen, San Jose, CA (US); Manish Ahluwalia, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 458 days.

(21) Appl. No.: 10/692,981

(22) Filed: Oct. 24, 2003

(65) Prior Publication Data

US 2005/0091439 A1 Apr. 28, 2005

(51) Int. Cl.
*G06F 12/00* (2006.01)
(52) U.S. Cl. ....................................... 711/212
(58) Field of Classification Search ............... None
See application file for complete search history.

(56) References Cited

U.S. PATENT DOCUMENTS

| | | | |
|---|---|---|---|
| 5,710,907 A * | 1/1998 | Hagersten et al. | 711/148 |
| 6,052,763 A * | 4/2000 | Maruyama | 711/152 |
| 6,154,818 A * | 11/2000 | Christie | 711/163 |
| 6,854,114 B1 * | 2/2005 | Sexton et al. | 718/1 |
| 2003/0101322 A1 * | 5/2003 | Gardner | 711/163 |

* cited by examiner

Primary Examiner—Reginald Bragdon
Assistant Examiner—Daniel Ko

(57) ABSTRACT

In one embodiment of the invention, a method is provided to allow an operating system to support both address space layouts of a SAS OS and a MAS OS at the same time, with the choice of which layout type to be used to be made by the application developer. In one embodiment the method includes: selecting one of a mostly private address space (MPAS) model and a mostly global address space (MGAS) model, where if the MPAS model is selected, then a process is permitted to map a shared object in a mostly private address space (MPAS) layout so that the process perceives a behavior as if the process is running on a multiple address space operating system, and where if the MGAS model is selected, then the process is permitted to map a shared object in a mostly global address space (MGAS) layout so that the process perceives a behavior as if the process is running on a single address space operating system.

26 Claims, 13 Drawing Sheets

32bit MPAS Address Space Layout (ASL) in segmented representation

64bit MPAS (in segmented representation)

64bit MPAS in flat representation (only octants 0-5 are shown)

Allocating Address Space for 32bit MPAS Processes

METHODS AND APPARATUS FOR A DUAL ADDRESS SPACE OPERATING SYSTEM

TECHNICAL FIELD

Embodiments of the present invention relate generally to operating systems for computers.

BACKGROUND

An address space refers to a range of either physical or virtual addresses that acre accessible to a processor or reserved for a process. A process is an instance of a program running in a computer. On a computer, each process is allocated address space, which is some portion of the processor's address space.

Current and previous operating systems have only one address space model that is provided to the application developers. Current or previous operating systems either have the "single address space model" or the "multiple address space model". In the single address space model, an entire machine or computer has one address space that all applications use. In the multiple address space model, each process running on the computer has its own address space. For the application writer, the single address space model has better performance, but less flexibility, than the multiple address space model.

Thus, the current approaches and/or technologies are limited to particular capabilities and/or suffer from various constraints.

SUMMARY OF EMBODIMENTS OF THE INVENTION

In one embodiment of the invention, a method is provided to allow an operating system to support both address space layouts of a single address space operating system (SAS OS) and a multiple address space operating system (MAS OS) at the same time, with the choice of which layout type to be used to be made by the application developer. The application developer can choose the Mostly Private Address Space Model (MPAS Model) or the Mostly Global Address Space Model (MGAS Model). Therefore, the application developer will have the flexibility to choose which address space model to use on the same instance of the kernel.

In another embodiment of the invention, a method includes: selecting one of a mostly private address space (MPAS) model and a mostly global address space (MGAS) model, where if the MPAS model is selected, then a process is permitted to map a shared object in a mostly private address space (MPAS) layout so that the process perceives a behavior as if the process is running on a multiple address space operating system, and where if the MGAS model is selected, then the process is permitted to map a shared object in a mostly global address space (MGAS) layout so that the process perceives a behavior as if the process is running on a single address space operating system.

These and other features of an embodiment of the present invention will be readily apparent to persons of ordinary skill in the art upon reading the entirety of this disclosure, which includes the accompanying drawings and claims.

DETAILED DESCRIPTION OF PREFERRED EMBODIMENTS

Figure 1:
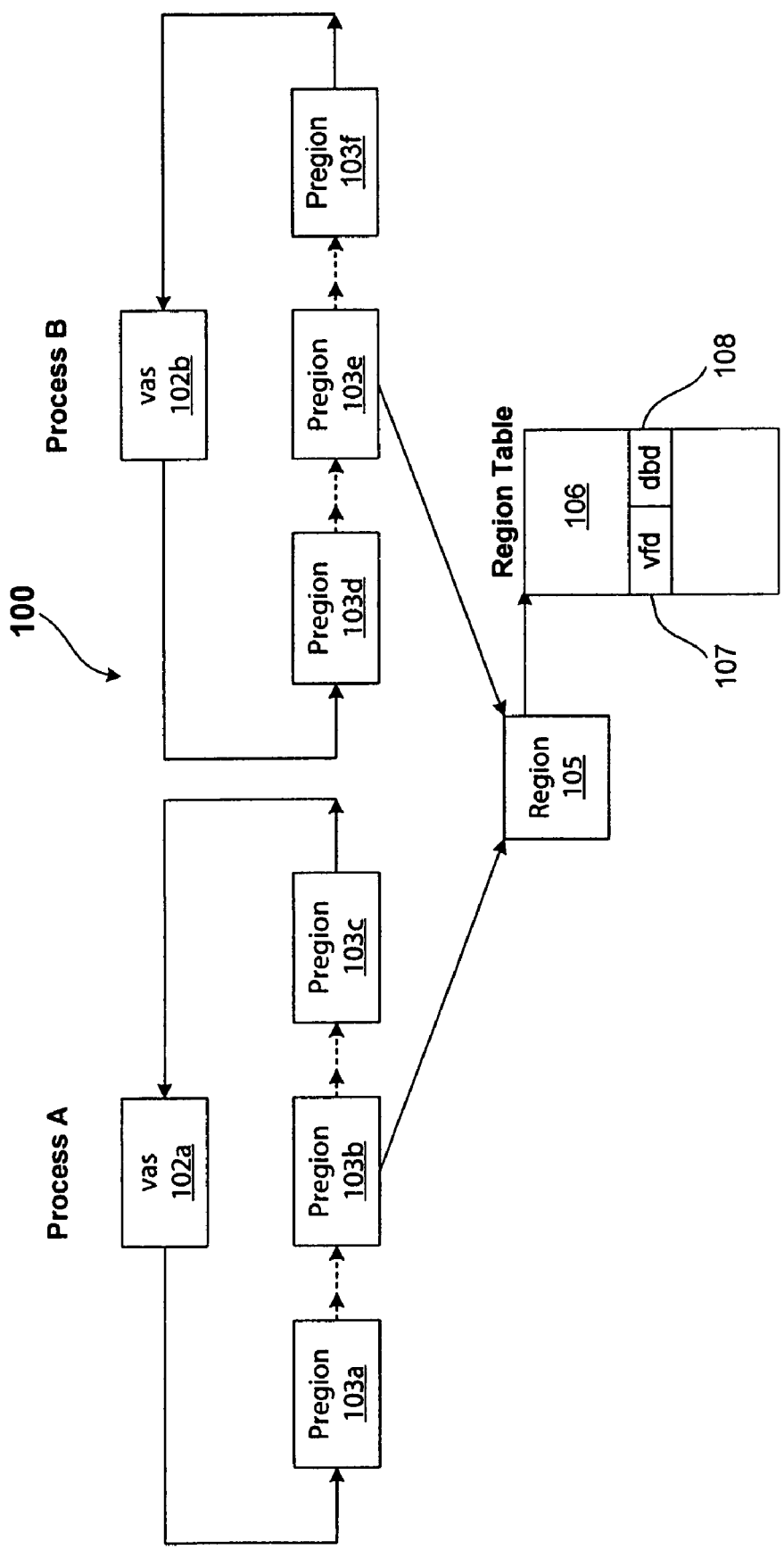
FIG. 1 is a block diagram of a virtual address space architecture that can function with an embodiment of the invention.

In the description herein, numerous specific details are provided, such as examples of components and/or methods, to provide a thorough understanding of embodiments of the invention. One skilled in the relevant art will recognize, however, that an embodiment of the invention can be practiced without one or more of the specific details, or with other apparatus, systems, methods, components, materials, parts, and/or the like. In other instances, well-known structures, materials, or operations are not shown or described in detail to avoid obscuring aspects of embodiments the invention.

An embodiment of the invention provides to the application user the flexibility to choose either a single address space (SAS) model or multiple address space (MAS) model on the same instance of the kernel. The application user can choose between the two address space models, and the operating system will support both models.

The following terms are now defined, for purposes of providing a background for understanding the various embodiments in accordance with the invention.

Address space—An address space of a process refers to the range of virtual addresses that are accessible by the process. A 32 bit application will have a 32 bit address space and a 64 bit application will have a 64 bit address space. An address space is composed of a private address space and a shared address space.

Aliasing—This occurs when two or more virtual addresses share (point to) the same physical page. In computer systems that use virtual memory, a page is a unit of data storage that is brought into real storage (RAM) from auxiliary storage, also known as swap storage (usually the hard disk) when a requested item of data is not already in real storage (RAM).

Equivalently Aliased—This is a condition when two virtual addresses map to the same physical address, and where the two addresses map to the same cache line in the processor's cache.

Fault—This is condition that needs higher level software (virtual memory) (VM) to resolve a memory reference exception. Faults are generated when there is no translation in the page table or there is an access violation.

Mapping—This is range of virtual addresses that is associated with a memory object (region). This is stored in a VM data structure called "pregion" which contains a pointer to a memory object and the address of a mapping to that memory object.

Multiple address space operating system (MAS OS)—This is an operating system that uses a unique address space for each process. Sharing of the same object between two or more processes is achieved by using aliasing to share memory. Thus, a process is prevented from accessing an address that it has not mapped by not having a translation.

Mostly global address space (MGAS) process—Shared objects will reside in the global address space. Shared objects will be placed in the private address space when there is no space available in the shared address space.

Mostly private address space (MPAS) process—Both shared and private objects will reside in the private address space by default. A user could place the shared object in a global address space by using special flag.

Non-Equivalently Aliased—This is a condition in which two virtual addresses map to the same physical address, but do not meet the requirements for equivalently aliased addresses.

Private Address Space—This is an address space that is available only to a single process. In a current implementation (but not a limitation in other embodiments), a private address space can contain only private objects (with the exception of exclusive, shared mappings).

Private object—This is an object that is mapped only by one process and is not shared with other processes. Examples of a private object include, data, stack, and other types objects.

Single Address Space operating system (SAS OS)—This is commonly referred to an operating system that uses a global address space for all processes. Sharing of the same object between two or more processes is achieved by using the same global address. In a SAS OS model, all processes share the same translation but use protection keys to prevent a process from accessing an address that has not mapped.

Shared Address Space—This is an address space that is shared among processes. In one embodiment, a shared address space can contain only shared mappings.

Shared Object—This is an object that can be mapped by one or more processes. Examples of a shared object include, system Virtual shared memory, file, and other types of shared objects.

An embodiment of the invention permits the applications user, instead of the OS designer, to decide whether the multiple address space operating system (MAS OS) model or the single address space operating system (SAS OS) model will be used for running applications that are run on a computer. Through the application format, commands, and tools (such as, for example, a linker), the user can specify if the MAS OS model or SAS OS model will run all applications. After the user specifies the address space model, the virtual memory will load an application, and based on the address space model specified by the application, the text, data, and shared memory is accordingly assigned in memory.

FIG. 1 is a block diagram of a virtual address space architecture 100 that can function with an embodiment of the invention. The virtual address space architecture 100 typically operates in a computer hardware environment. Each process (e.g., Process A and Process B) contains a vas structure (e.g., vas structures 102a and 102b). Each vas (virtual address space) structure has a linked list of user mappings. The user mappings are represented by the pregion structures (e.g., pregion structures 103a to 103f). A pregion structure (generally referred to as pregion 103) contains a pointer to a memory object and an address of the mapping to that memory object. The memory object is represented by the region structure 105. The region structure 105 stores a region table 106 that maps the memory object to a physical address and backing store. The backing store could be one of anonymous, file or swap. Each entry in the region table 106 contains a vfd 107 and dbd 108. The vfd 107 contains the physical address in memory and the dbd 108 contains the location in the backing store.

The pregion structure 103 can be represented as a <vaddr, region offset> tuple and the region structure 105 can be represented as a <region offset, pfn> tuple. A translation is created by combining the two tuples to form the <vaddr, pfn> tuple. As known to those skilled in the art, in programming languages, such as LISP, Python, Linda, and others, a "tuple" is an ordered set of values. The separator for each value is often a comma (depending on the rules of the particular language). Common uses for the tuple as a data type are (1) for passing a string of parameters from one program to another, and (2) representing a set of value attributes in a relational database. In some languages, tuples can be nested within other tuples within parentheses or brackets or other delimiters. Tuples can contain a mixture of other data types.

The virtual memory currently uses a non-aliased shared memory model to share memory. All processes that map a shared memory segment (a memory mapped file or system virtual shared memory) will use the same global address. In other words, the virtual address in the pregion 103 for all processes that share the same memory segment will be identical.

To support MPAS executables, an aliased shared memory model is typically necessary. All MPAS processes that map a shared memory segment will use a private address. In this case, the address in the pregion will be different from other pregions.

Figure 2:
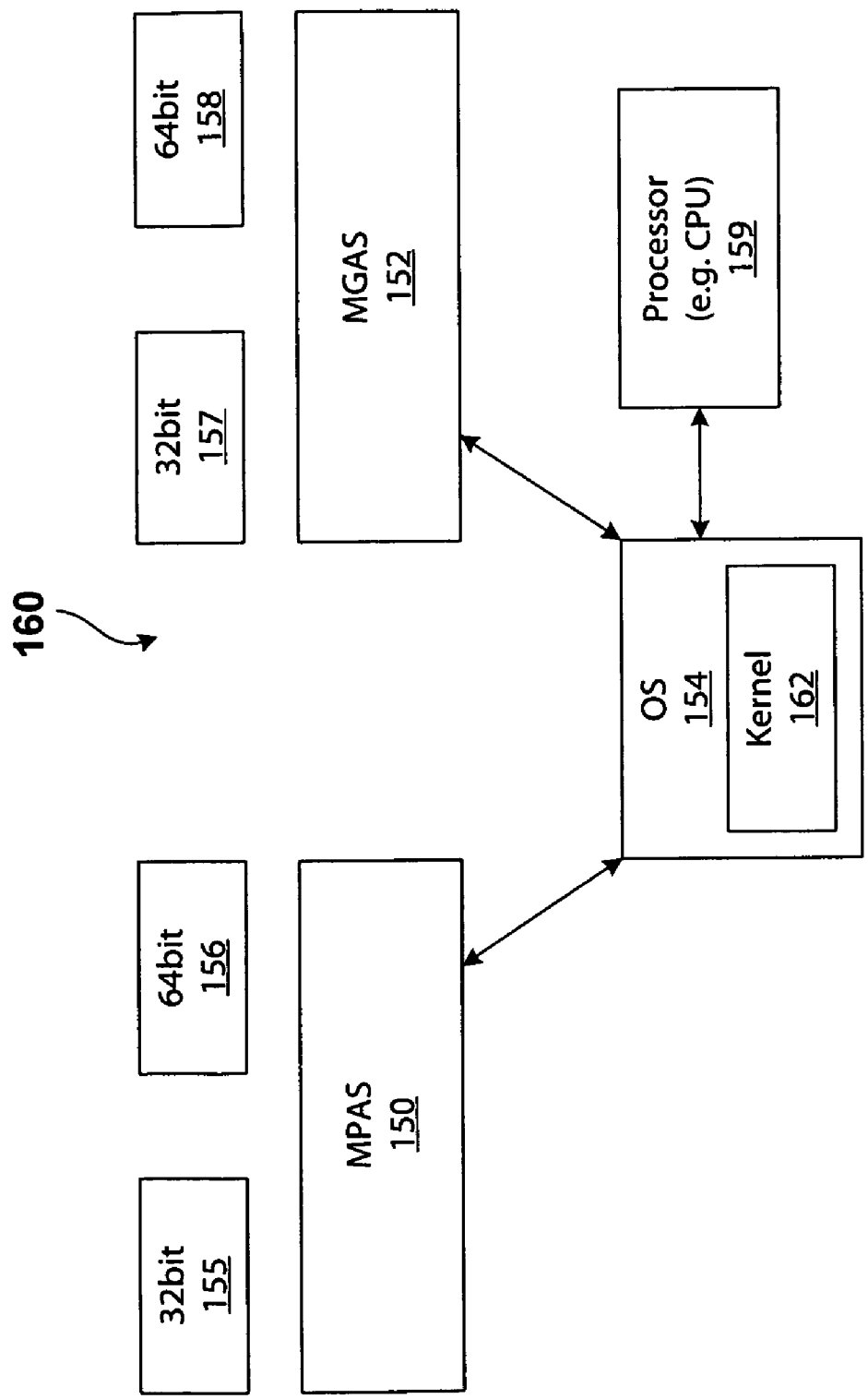
FIG. 2 is a block diagram of a dual address space operating system, in accordance with an embodiment of the invention.

An embodiment of the invention provides a flexible address space model the lets the application user to decide the address space model to be supported by an operating system. Reference is now made to FIG. 2. The application developer can choose the Mostly Private Address Space Model (MPAS Model) 150 or the Mostly Global Address Space Model (MGAS Model) 152. A processor (e.g., CPU) 159 will execute an operating system (OS) 154 and other software in the computer 160. The operating system 154 manages the applications that will run in the computer 160. The operating system 154 includes a kernel 162 which is the operating system's inmost layer or core of services. Typically, the kernel 162 includes a manager of the operating system's 154 address spaces in memory or storage, so that the address spaces are shared among all components and other users of the services of the kernel 162. Other known software and hardware components in the computer 160 are not shown in FIG. 2, for purposes of describing the functionality of embodiments of the invention.

In the case where the MPAS model 150 is chosen by the application developer, the application will have complete control of the address space process. The application will perceive the same behavior as though the application was running on a traditional Multiple Address Space operating system (MAS OS) (e.g., SUN or LINUX operating system). Example applications are shown as the 32 bit application 155 and the 64 bit application 156. In this case, the application developer trades off performance for more flexibility. A 64 bit application can, for example, choose a global address space for better performance by using special flags such as MAP_GLOBAL when using the mmap( ) call and IPC_GLOBAL when using the shmat( ) call. This option (of choosing a global address space) is not available for 32 bit applications because of the limited address space. The whole 4 GB addressable by a 32 bit application is designated as private due to limited address space.

In the case where the MGAS model 152 is chosen by the application developer, the application does not have much control of the shared address space of the process. The application will perceive the same behavior as though the application was running on a traditional Single Address Space Operating System (SAS OS). Example applications are shown as the 32 bit application 157 and the 64 bit application 158. In the MGAS model 152, the application trades off flexibility for better performance. When an application (either a 32 bit and 64 bit application) wants to map a shared memory segment and the operating system 154 has exhausted all of the shared address space, then the operating system 154 may use a private address space of the process to map the shared memory segment. This makes the address space model more adaptive and avoids application failure. It reduces the address space pressure but adds to the TLB pressure.

The dual address space OS 154 (FIG. 2) has the following benefits.

(1) It provides complete compatibility for existing applications.

(2) There is no performance degradation of existing applications or applications that is compiled with default behavior.

(3) An application developer has the choice to decide between performance and address space flexibility.

(4) It is extensible for future technical advances.

(5) With a multiple (dual) address space model, the system can run applications that traditionally work well with a multiple address space OS and applications that work well with a single address space OS.

Discussed below are some terminologies relating to the dual address space model, in accordance with an embodiment of the invention.

The term "virtual address" means the 32 bit or 64 bit address (for a 32 bit process or 64 bit process, respectively) that is generated within the context of or on behalf of a process. The entire range of virtual addresses that can be generated constitutes the virtual address space (also referred herein as "address space") of a process.

The term "global virtual address" is used to denote the combination of address space identifier (ASID) and virtual address (or offset) that is used by the computer hardware to access a virtual memory location. The address space is called "space ID" in the HP-PA architecture (Hewlett-Packard's range of RISC processors) and is called "region ID" in Intel's Itanium architecture. As an example, consider 32 bit processes. Each process has an address space that ranges from 0x00000000 to 0xFFFFFFFF (see FIG. 4B, for example). However, the same virtual address within two (2) processes may map to different global virtual addresses, depending on the value of the corresponding region registers.

An object (e.g., anonymous segment, mmaped file, system V shared memory, stack, etc.) that can be shared (read/written, depending on permissions) by multiple processes is a "shared object". An object that can be shared by multiple processes but is currently in use by only one process is still a shared object.

An object that can be used only by one process is a "private object". A private object is created by the process for the purpose of using it only within the context of the process.

An address space that is within the exclusive control of the process is "private address space". This means that a process can expect that another process will not consume its private address space. Except for rare cases, a process can expect that its private address space is not accessible to other processes.

An address space that is not entirely within the control of the process is a "shared address space". The shared address space is global to the entire system. The shared address space may be visible to other processes. Accessing the address in global address space is protected by using protection keys (called protection IDs in the HP-PA architecture).

A private address space is tied to a particular process. A shared address space is not tied to a particular process. The shared address space could be accessible to any process (4th quadrant in 32 bit address space) or to a subset (as is the case with memory windows).

In the current implementation of HP-UX, the private address space contains only private objects and the shared address space contains only shared objects. On the other hand, in an embodiment of the invention, the private address space can contain both private and shared objects, and the shared address space still can contain only shared objects.

Two different global virtual addresses that translate to the same physical page are "aliases". When a shared object is mapped in private address space, it is typically shared using aliases. This is known as "aliasing". In this, the object has many private mappings that alias different global virtual addresses to the same physical page(s) storing the object's contents. This is the method used by multiple address space (MAS) operating systems to share data across processes. Under this scheme, the virtual memory subsystem needs to add a translation to the physical page for each process that needs to access the physical page. This has two consequences (contrast with the following scheme):

1. Sharing is at page granularity: This means that if process A maps the shared objects X and Y and process B maps the shared object Y only, then only the physical pages corresponding to object Y (and not X) have a translation in the address space of process B.

2. Protection IDs are not required to prevent illegal access to data: A process's ability to access a page is controlled solely by the translation —if the translation is present in its virtual space, the process can access the page as allowed by the translation (read/write); otherwise the process cannot access the page. On the HP-PA architecture, long pointer addressing is allowed. So, one protection ID is used for the whole private address space.

When a shared object is mapped in the shared address space, the shared object can be shared by all processes using the same global virtual address. This is the method used in the current implementation of HP-UX to share data across processes. Since global virtual addresses are composed of the space (or region) ID and offset, this method of sharing implies that both processes must typically have access to the same space ID. Thus, in contrast to the method of sharing using aliasing, this scheme differs based on the following:

(1) In this scheme the entire octant/quadrant of virtual addresses is shared. Thus, if processes A maps shared objects X and Y and process B maps shared object Y only, then process B will have object X residing in its virtual address space.

(2) The virtual memory subsystem typically therefore use protection IDs and access rights to prevent illegal accesses to data.

MPAS Process

A process that maps a shared object in a private address space is called an "MPAS" (mostly private address space) process. Such a process perceives the same behavior as though the process is running on a typical MAS Operating System such as, for example, Solaris or Linux. Shared objects are mapped using aliasing. The process can map shared objects in a global address space for better performance using certain flags (e.g., MAP_GLOBAL, IPC_GLOBAL). This feature, using global address space for high-performance sharing, is not typically available for 32 bit applications because of limited address space. The global address space is shown, for example, as segment 530 (RR5) in the 64 bit MPAS address space layout (ASL) 500 in FIG. 5.

The name MPAS refers to the kind of address (shared vs. private) that is allocated to objects that this process wants to share. The name MGAS is contrasted below.

MGAS Process

A process that maps a shared object in a shared address space is called an "MGAS" (mostly global address space) process. Such a process perceives the same behavior as though the process is running on a typical SAS Operating System such as, for example, HP-UX. Shared objects are mapped using a global address. Such a process may have part of its virtual address space consumed by other processes. If there is not enough space in the shared address space, then the kernel may map shared objects in private address space, as an optional implementation feature.

The name MGAS refers to the kind of address (shared vs. private) that is allocated to objects that this process wants to share.

Page Table

The page table is an important element of the VM (virtual memory) design. The page table stores all the translations that map a virtual address to a physical address. This page table is searched during a TLB miss. If a translation is found in the page table, then the entry (translation) is inserted into the TLB. In other words, when a translation that an application will use is not in the TLB, then the translation is searched in the page table and that translation is loaded as an entry from the page table into the TLB. If an entry is not found in the page table, then a higher level virtual memory fault handler is called to resolve the translation fault. Some architectures, such as IA-64, have a hardware walker that searches the page table for better performance.

With a dual address space OS, the use of address aliasing will increase, since aliasing is used to share memory. Address aliasing places more pressure on the page table design. An embodiment of the invention permits the page table design to accommodate the following:

1. The page table should support a large number of aliases without sacrificing performance and efficiency.

2. The page table is preferably less complex, but extensible for future enhancements.

Page Table Overview

Figure 3:
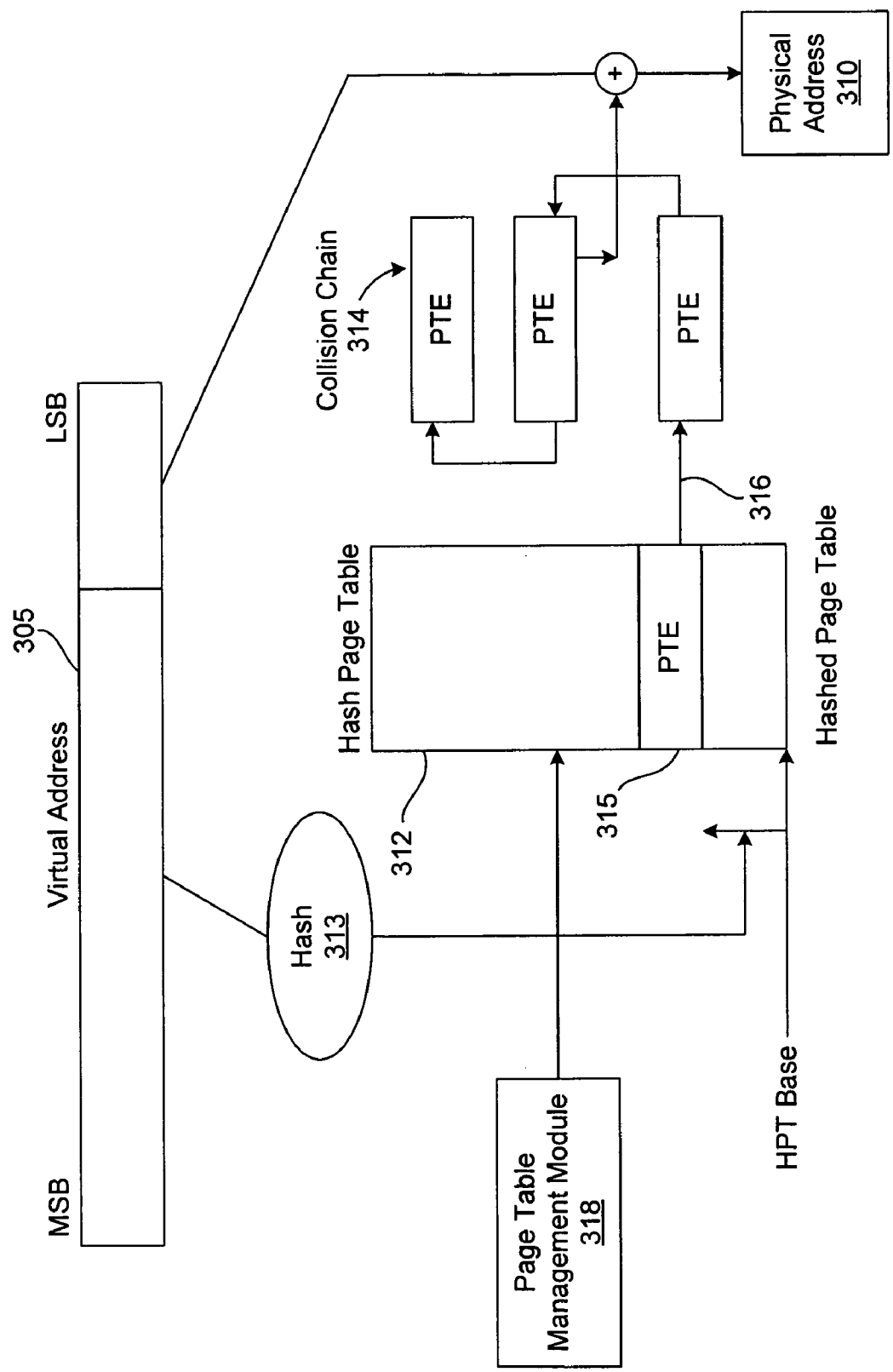
FIG. 3 is a block diagram of a hashed page table, in accordance with an embodiment of the invention.

All architectures today (e.g., PA-RISC, IA-64, etc.) use a virtual addressing model. As shown in FIG. 3, the applications running on these architectures access virtual addresses 305 that are mapped to a physical address 310. These virtual addresses 305 need to be converted to a physical address to locate the data. The mapping of the virtual address to a physical address is referred to as a "translation". This mapping from a virtual address to a physical address is provided by the page table. For better performance a subset of these translations are stored in the TLB (Translation Lookaside Buffer). The TLB is typically implemented in the central processing unit (CPU) of the computer.

The page table is essentially a memory based table that contains the translations. The page table is primarily designed for efficient retrieval of translations using the virtual address as the key. There are several known techniques used to design the page table (see, e.g., Jerry Huck, Jim Hays, "Architectural Support for Translation Table Management in Large Address Space Machines", in Proceedings of the 20$^{th}$ International Symposium on Computer Architecture, pages 39–50, ACM, which is hereby fully incorporated herein by reference). Every page table design attempts to optimize three different characteristics:

1. Minimize the time to service a TLB miss.

2. Minimize the physical memory space to maintain translations.

3. Maximize the flexibility for software to support a variety of VM mechanisms and capabilities.

There are three commonly used designs for the page table: (1) Forward-mapped page tables (these are sometimes referred to as a multi-level page table and are used in Solaris and Linux); (2) Inverted page table (this is used in IBM AIX); and (3) the hashed page table (this is used in HP-UX).

Hashed Page Table

The hashed page table is very similar to the inverted page table. It combines the inverted page table and the hash table into a single hashed structure, termed Hashed Page Table (HPT) 312. Each entry in the hash table contains both the virtual address and the physical address. It is noted that the hashed page table shown in FIG. 3 is just one example technique that is used by the operating system 154 in order to map a virtual address to a physical address. Other suitable techniques may be used by the operating system 154 in order to perform the intended functionalities.

The hashed page table 312 is indexed by some function 313 of the virtual address 305. The hash collision chain 314 is searched for the faulting address. If a match is found, then the TLB is directly loaded with the entry. If no match is found, a page fault is initiated that needs to be handled by virtual memory (VM).

Each page table entry (PTE) 315 typically contains the following fields:

(1) The virtual page number to which the entry maps.

(2) The physical page number to which the entry maps.

(3) A pointer 316 to the next entry in the hash collision chain.

(4) Flags such as valid, referenced, and modified.

(5) Protection and locking information.

Like the inverted page table, all the processes share this global table (hash page table 312). The addresses used by each process are unique. The address space identifier (ASID) of each process is included in the virtual address 305. Virtual address isolation is achieved by using protection keys.

This implementation is used in HP-UX. On IA-64, the main hash table (without the collision entries) is concurrently used as a VHPT (Virtual Hash Table). The VHPT, as defined by the IA-64 architecture, is an extension of the TLB hierarchy designed to enhance virtual address translation performance. The IA-64 architecture is described further in, Intel IA64, "Intel IA-64 Architecture Software Developer's Manual", Volume 2, which is hereby fully incorporated herein by reference. The processor's VHPT walker can optionally be configured to search the VHPT for a translation after a failed instruction or data TLB search. The VHPT walker provides significant performance enhancements by reducing the rate of flushing the processor's pipelines due to a TLB Miss fault, and by providing speculative translation fills concurrent to other processor operations.

The main advantage of the hash table is that it is space efficient. The size of the page table is a linear function of the physical memory. Aliasing can be supported by adding the entries into the hashed page table 312. This creates multiple entries for the same physical page. Too much aliasing can reduce the effectiveness of the hashed page table due to long collision chains. The hashed page table is ideal for operating systems, such as HP-UX, that use a single address space (SAS) model.

With the support of applications that use the MPAS model, the number of aliases will increase significantly. This, in turn, will increase the number of collisions and impact overall system performance. To overcome this problem, a hashed page table with LRU (least recently used) replacement is alternatively provided in an embodiment of the invention.

In this alternative, the above-mentioned hashed page table design is retained but the page table 312 is used as a cache of translations. Thus, the page table 312 does not contain all the translations but contains the most frequently used translations. The MPAS processes will add the alias entries into the hashed page table 312. To reduce the collision chains due to many alias entries, an LRU (least recently used) algorithm can be used to replace entries in the collision chain 314. No kernel translations will be replaced. User translations will be removed from the hash page table 312 by using some form of the LRU policy that is executed by the page table management module 318.

Various alternatives can be used to implement the LRU policy. The LRU policy will prevent the collision chain 314 from growing too long. As an example, in one LRU policy, the page table management module 318 monitors the active and inactive translations by setting a bit associated with a translation for each instance that the translation is used. The inactive or least recently used translations are periodically removed or pruned by the page table management module 318.

The main advantages of a hash page table with LRU replacement include, for example, the following:

(1) An embodiment of the invention can retain all the advantages of the hashed page table.

(2) Improved performance.

(3) Page table performance is independent of the number of MPAS processes.

(4) Less memory requirement for the page table.

Address Space Layout (ASL)

In this section, address space layouts (ASLs) are described for processes that will run under an architecture, in accordance with an embodiment of the invention.

A "private address space" is the portion of the process's address space that is under the process's control. This private address space could include private objects, or objects shared with other processes by using aliasing.

A "shared address space" is the portion of the process's address space that is not entirely under the process's control. This uses the same semantics as the shared quadrants in HP-UX architecture and PA-RISC architecture.

Figure 4A:
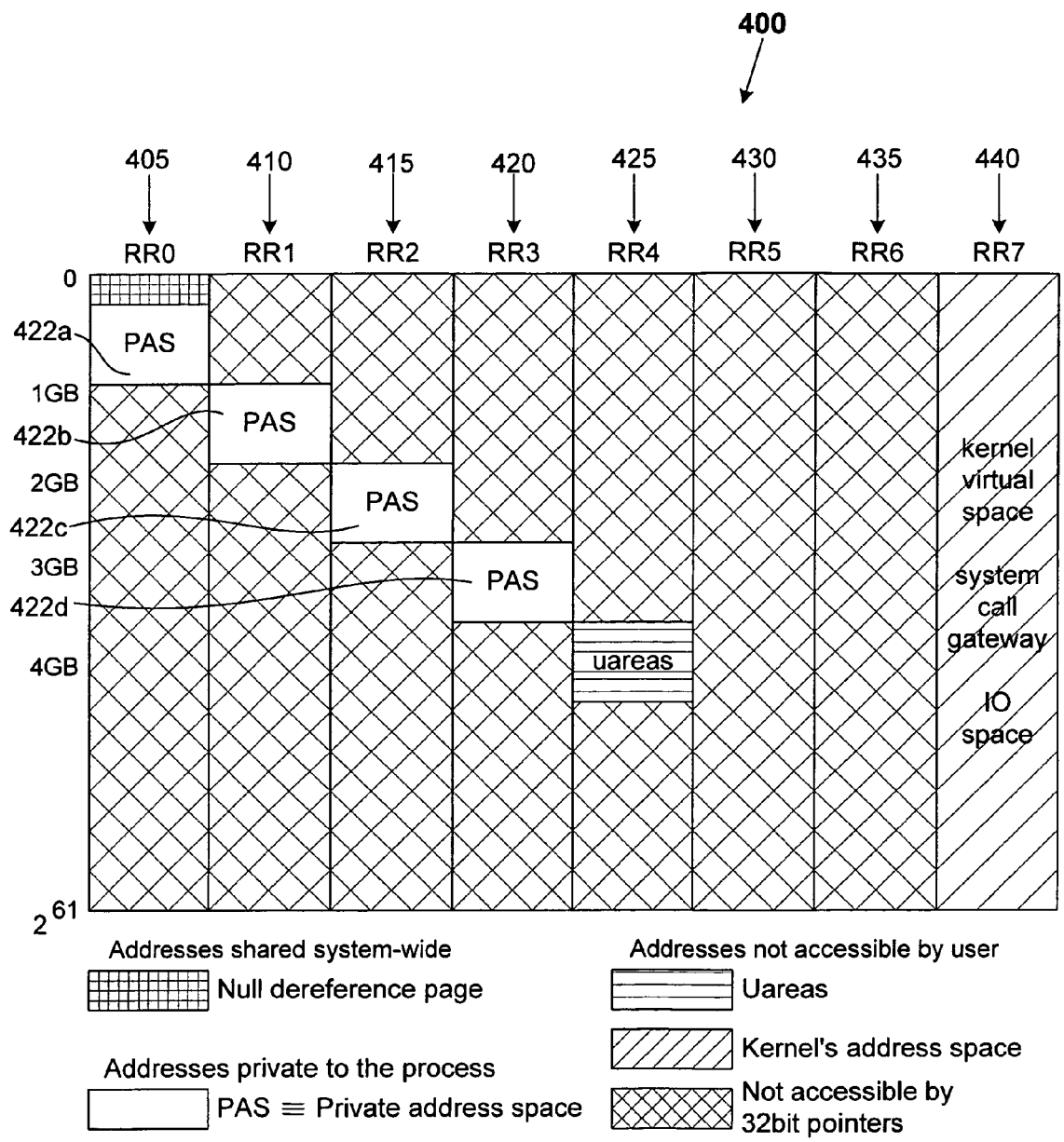
FIG. 4A is a block diagram of an address space layout for a 32 bit MPAS application, in accordance with an embodiment of the invention.

FIG. 4A is a block diagram of an address space layout 400 for a 32 bit MPAS application (where the layout 400 is shown as segmented representation), in accordance with an embodiment of the invention. In other words, the layout 400 is the segmented virtual address space for a process running as a 32 bit MPAS model. Segments 405 to 420 are in the private data space (where the private data space is an address space that is private to the process). Segment 425 is an unused area, and segments 430 and 435 are in space that is not accessible by 32 bit pointers. Segment 440 is the address space of the kernel 162. The segments 425, 430, 435 and 440 are addresses that are not accessible by the user.

The ASL 400 illustrates how a layout looks for a process that runs as a 32 bit MPAS model. For example, the process may be an application that is running in the MPAS model, and the application's layout will look like the ASL 400 in FIG. 4A. The entire address space for a process that runs as a 32 bit MPAS model is formed by private address spaces (i.e., private address spaces 422a, 422b, 422c, and 422d).

Figure 4B:
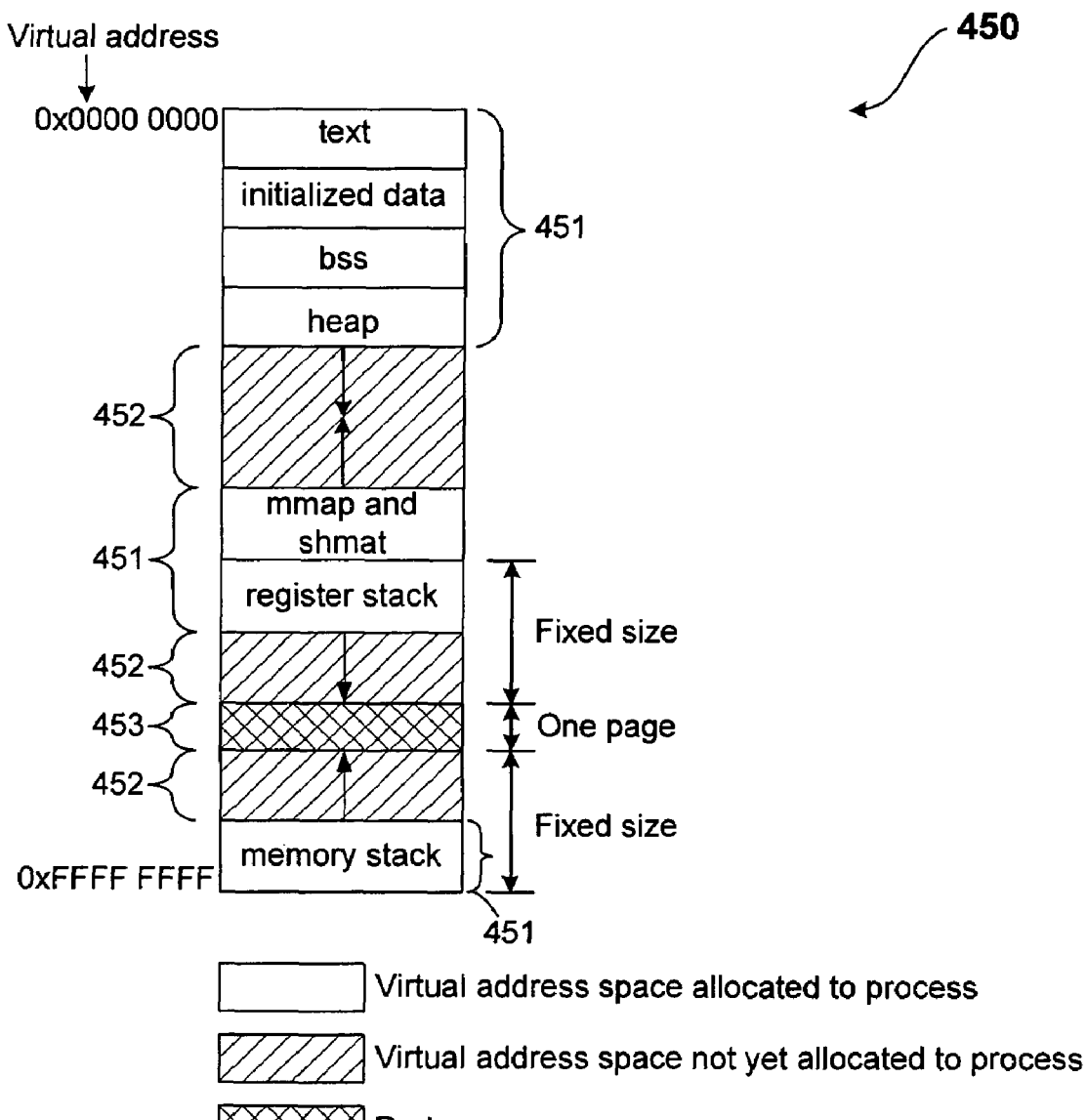
FIG. 4B is a block diagram of an address space layout for a 32 bit MPAS application (where the layout is shown as flat representation), in accordance with an embodiment of the invention.

FIG. 4B is a block diagram of an address space layout for a 32 bit MPAS application (where the layout is shown as flat representation 450), in accordance with an embodiment of the invention. Space 451 is the virtual address space allocated to process. Space 452 is the virtual address space not yet allocated to process. Space 453 is a "red zone" which does not permit user access.

All shared objects are mapped in the private address spaces in segments 405, 410, 415, and 420.

In an embodiment, for the 32 bit MPAS process, the entire address space of the process is private address space. This means that all mmaped objects (private and shared), and system virtual shared memory are allocated space from the same portion of the virtual address space. The mmap call allows the mapping of a shared file or private file. In other words, mmap is the Unix system call which establishes a mapping between a range of addresses in a user process's address space and a portion of some "memory object" (typically a file, one of the special "devices"/dev/mem or /dev/kmem or some memory-mapped peripheral). This allows the process to access a file at random byte offsets without using the seek system call or to access physical addresses or kernel's virtual address space. In contrast, in an embodiment, for the MGAS processes, the shared objects are allocated from shared address space and private objects are allocated from private address space.

Since the entire space is private to the MPAS process, the entire space can use the same region ID (space ID). This region ID is not available to any other process on the system. This means that the entire address space can use the public protection key. Special protection keys are not required to prevent another process from incorrectly using the translations for this process. In one embodiment, the sizes for the stacks are the same as those for MGAS processes.

The advantages of the above embodiment include the following:

1. Almost the entire address space is under the control of the process. The process can use its space for up to almost 4 Gs of private data, or shared data or any combination, etc.

2. Most frugal possible use of the address space: in other words, the user fails to allocate a page of virtual memory only when all such pages have been used up.

3. The embodiment is compatible with Solaris/Linux 32 bit ASL.

Figure 5A:
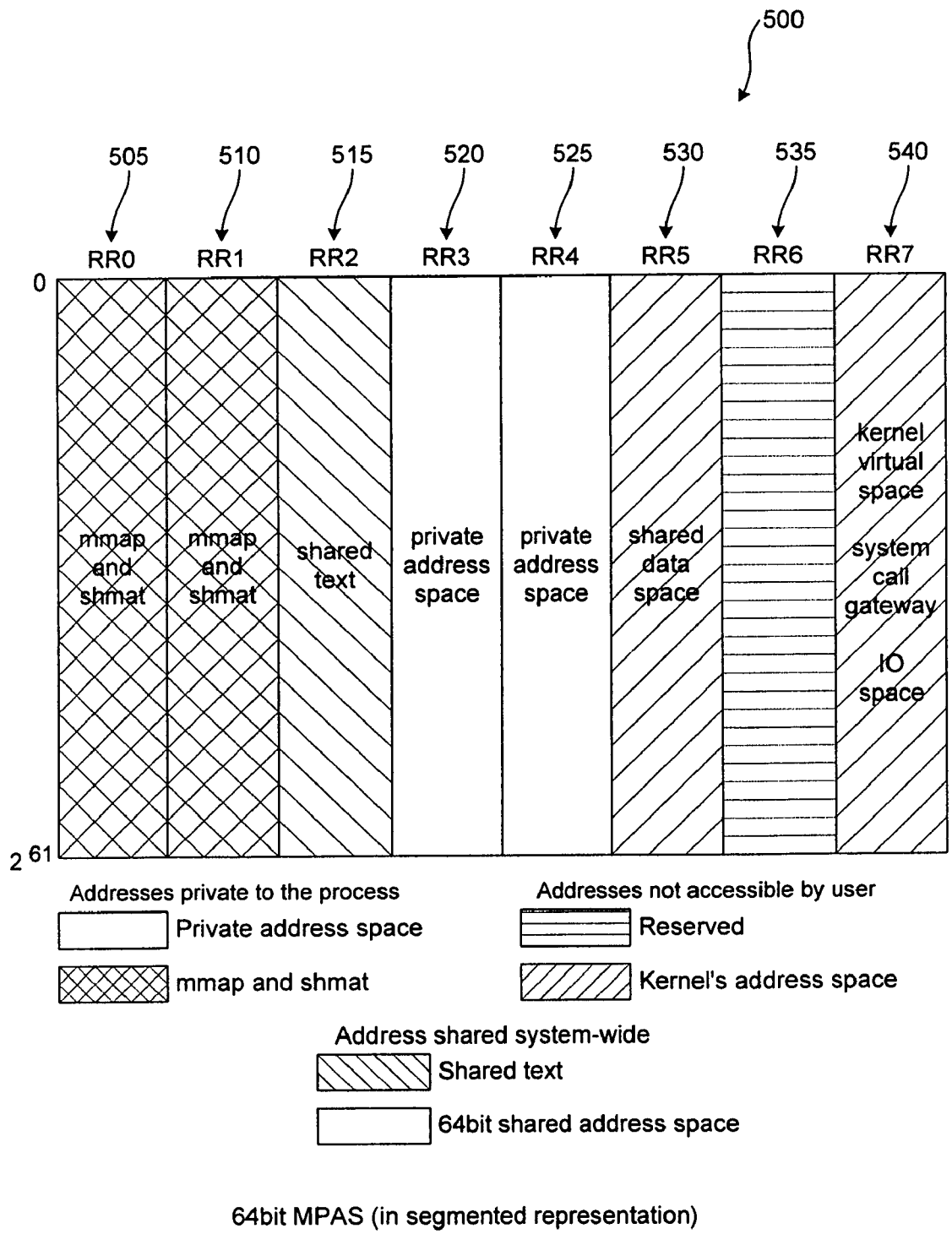
FIG. 5A is a block diagram of an address space layout for a 64 bit MPAS application, in accordance with an embodiment of the invention.

FIG. 5A is a block diagram of an address space layout 500 for a 64 bit MPAS application, in accordance with an embodiment of the invention. This address space layout is much larger than the address space for the 32 bit MPAS as shown in FIG. 4A. Segments 505, 510, 515, 520, and 525 are in the private data space. Segment 530 is a shared data space (global space), which include 64 bit shared addresses and shared text. The 64 bit shared addresses and shared text are addresses that are shared system-wide for all 64 bit processes. Segment 535 is reserved and is not accessible by the user. Segment 540 is the address space of the kernel 162. The segments 535 and 540 are addresses that are not accessible by the user. The above embodiment permits the sharing of text without aliasing. This is more efficient than other approaches.

Figure 5B:
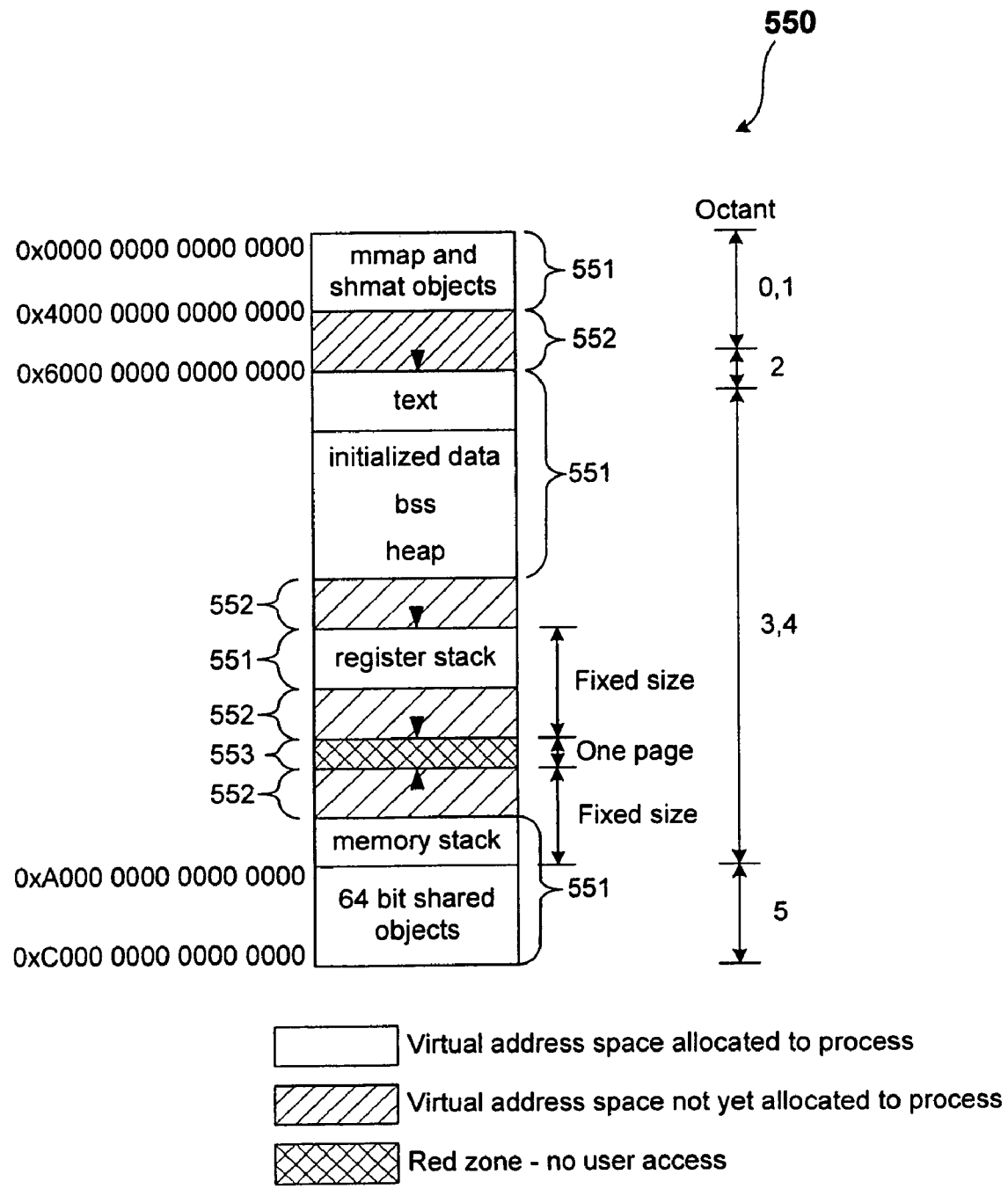
FIG. 5B is a block diagram of an address space layout for a 64 bit MPAS application (where the layout is shown as flat representation), in accordance with an embodiment of the invention.

FIG. 5B is a block diagram of an address space layout for a 64 bit MPAS (shown as flat representation 550), in accordance with an embodiment of the invention. Space 551 is the virtual address space allocated to process. Space 552 is the virtual address space not yet allocated to process. Space 553 is a "red zone" which does not permit user access.

If a process maps a memory object (such as a memory mapped file, system V shared memory, etc.) to a private address space, then the address obtained from the mapping is from the private address space. Since the private address space is unique to each process, if a second process (which is of the same type as the first process) maps to the same memory object, then that second process will obtain another address in the same private address space and both addresses will alias (point) to the same physical page in the memory object.

If a process maps a memory object to a global address space and a second process (which is of the same type as the first process) maps the same memory object, then the second process obtains the same address as the address of the first process. This leads to more efficiency in the use of hardware (i.e., CPU) resources.

In an embodiment, as a default setting, all shared objects are mapped into the private address spaces in the segments 505, 510, 515, 520, and 525 for the 64 bit MPAS ASL.

However, a flag can be set in the application program interface(s) (APIs) to override the above default setting so that the shared objects for a particular process is mapped in the global address space in segment 530.

Figure 6A:
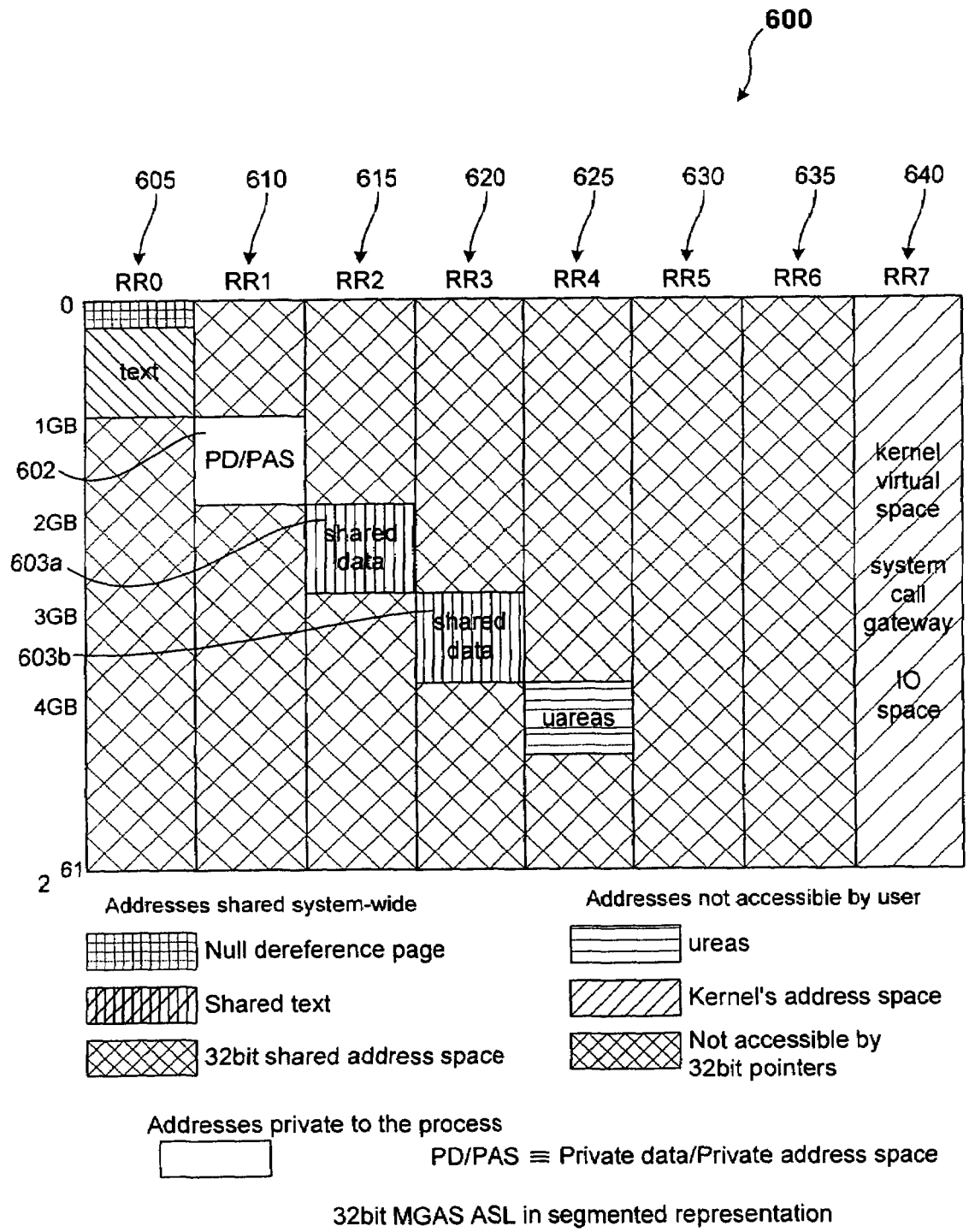
FIG. 6A is a block diagram of an address space layout for a 32 bit MGAS application, in accordance with an embodiment of the invention.

FIG. 6A is a block diagram of an embodiment of the address space layout 600 for a 32 bit MGAS process, in accordance with an embodiment of the invention. Segment 605 is a shared text space. Segment 610 is a private data space. Segments 615 and 620 are shared data spaces. Segment 625 is an unused area, and segments 630 and 635 are not accessible by 32 bit pointers. Segment 640 is the address space of the kernel 162. The ASL 600 illustrates how a layout looks for a process that runs as a 32 bit MGAS model. For example, the process may be an application that is running in the MGAS model, and the application's layout will look like the ASL 600 in FIG. 6A. The entire address space for a process that runs as a 32 bit MGAS model is formed by the private data/private address space 602 and shared address spaces 603a and 603b. The shared objects are stored in a shared data space in segment 615 or in segment 620. Every process can read the stored shared objects in the shared address spaces.

The private objects are stored in the private data/private address space in segment 610.

The shared objects and private objects are stored into the appropriate data space by the kernel 162.

Figure 6B:
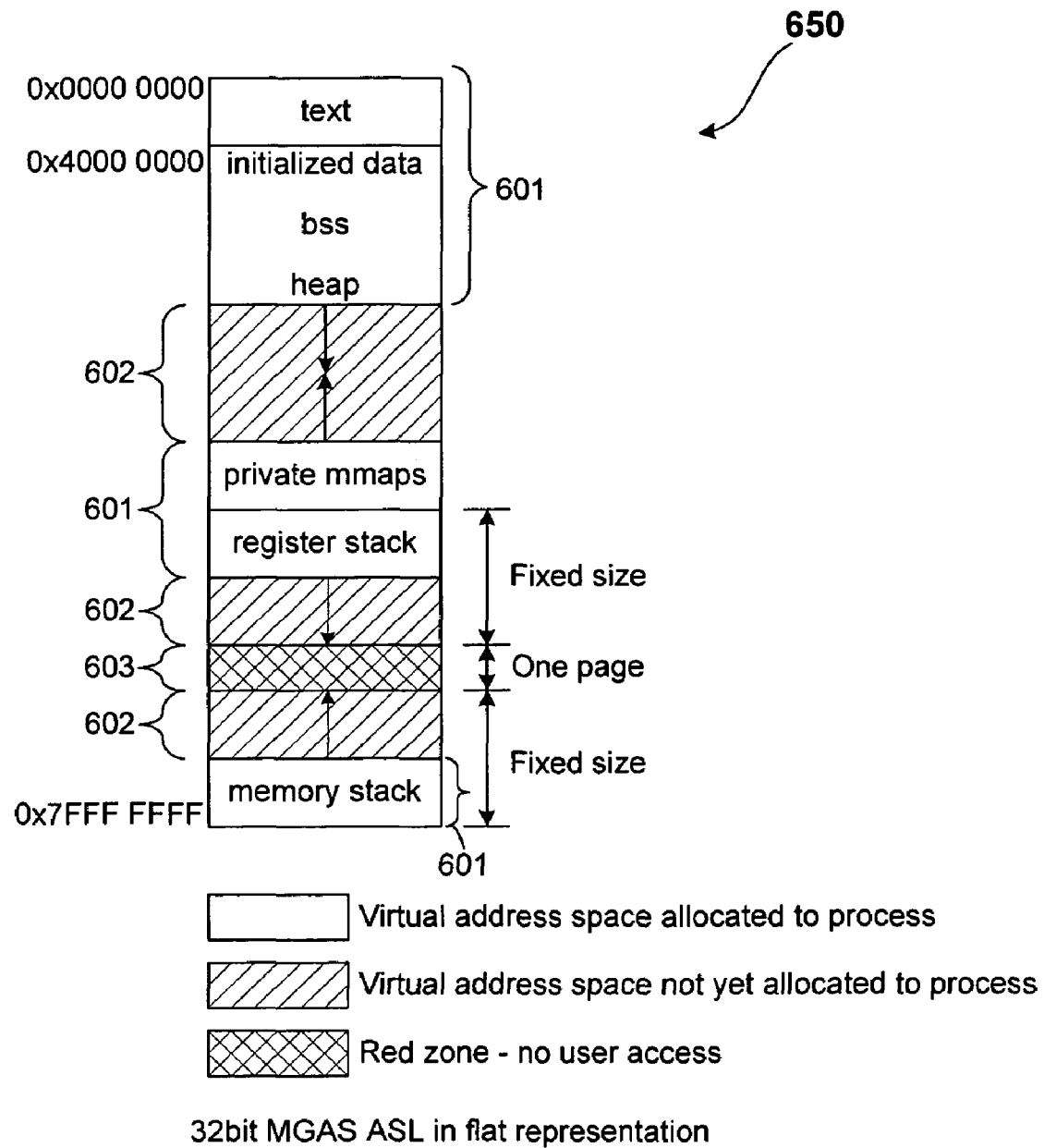
FIG. 6B is a block diagram of an address space layout for a 32 bit MGAS application (where the layout is shown as flat representation), in accordance with an embodiment of the invention.

FIG. 6B is a block diagram of an address space layout for a 32 bit MGAS application (where the layout is shown as flat representation 650), in accordance with an embodiment of the invention. Space 601 is the virtual address space allocated to process. Space 602 is the virtual address space not yet allocated to process. Space 603 is a "red zone" which does not permit user access.

Figure 7:
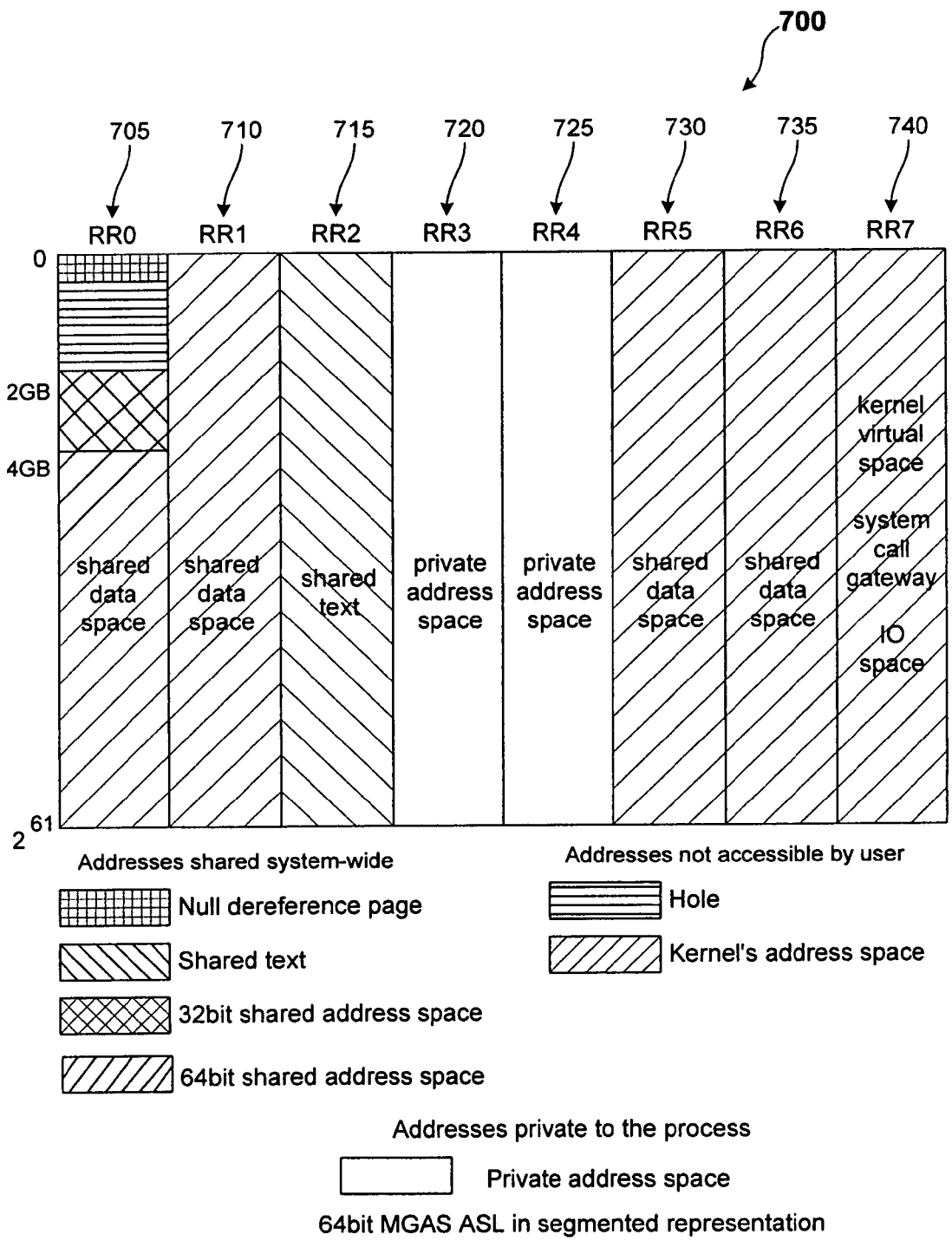
FIG. 7 is a block diagram of an address space layout for a 64 bit MGAS application, in accordance with an embodiment of the invention.

FIG. 7 is a block diagram of an embodiment of the address space layout 700 for a 64 bit MGAS application, in accordance with an embodiment of the invention. Segments 705, 710 and 730 are shared data spaces. Segment 715 is a shared text space. Segments 720 and 725 are private data spaces. Segments 735 are not usable. Segment 740 is the address space of the kernel 162.

In an embodiment, as a default setting, all shared objects are mapped into the private address spaces in the segments 720 and 725 for the 64 bit MGAS ASL.

However, a flag can be set in the application program interface(s) (APIs) to override the above default setting so that the shared objects for a particular process is mapped in the global address space in segments 705 and 730. This flag is typically stored in the binary 1005 (see FIG. 10) of the application and is read by the kernel 162. This way, the application can get the MPAS address space layout and the benefits of sharing that some with a Single Address Space (SAS) operating system.

Address Space Allocation for Shared Objects

An embodiment of the invention allows for the creation of aliases to shared objects. This means that different processes could share the same object using different global virtual addresses. It may even be possible for a single process to access the same object using two different virtual addresses within its address space. Aliasing multiple addresses to a shared object is not allowed in the current implementation of the HP-UX product.

In an embodiment, an object can be shared by using aliases. However, in a preferred embodiment, an object is not allowed to have two different virtual addresses in shared space. Hence, in this embodiment, it is acceptable for an object to be addressable via multiple global virtual addresses provided at most one of the global virtual addresses is in shared space. Also, the IA architecture recommends that aliased addresses be 1 MB aligned with each other.

The address space allocation function is performed by the operating system 154 (FIG. 2).

Figure 8:
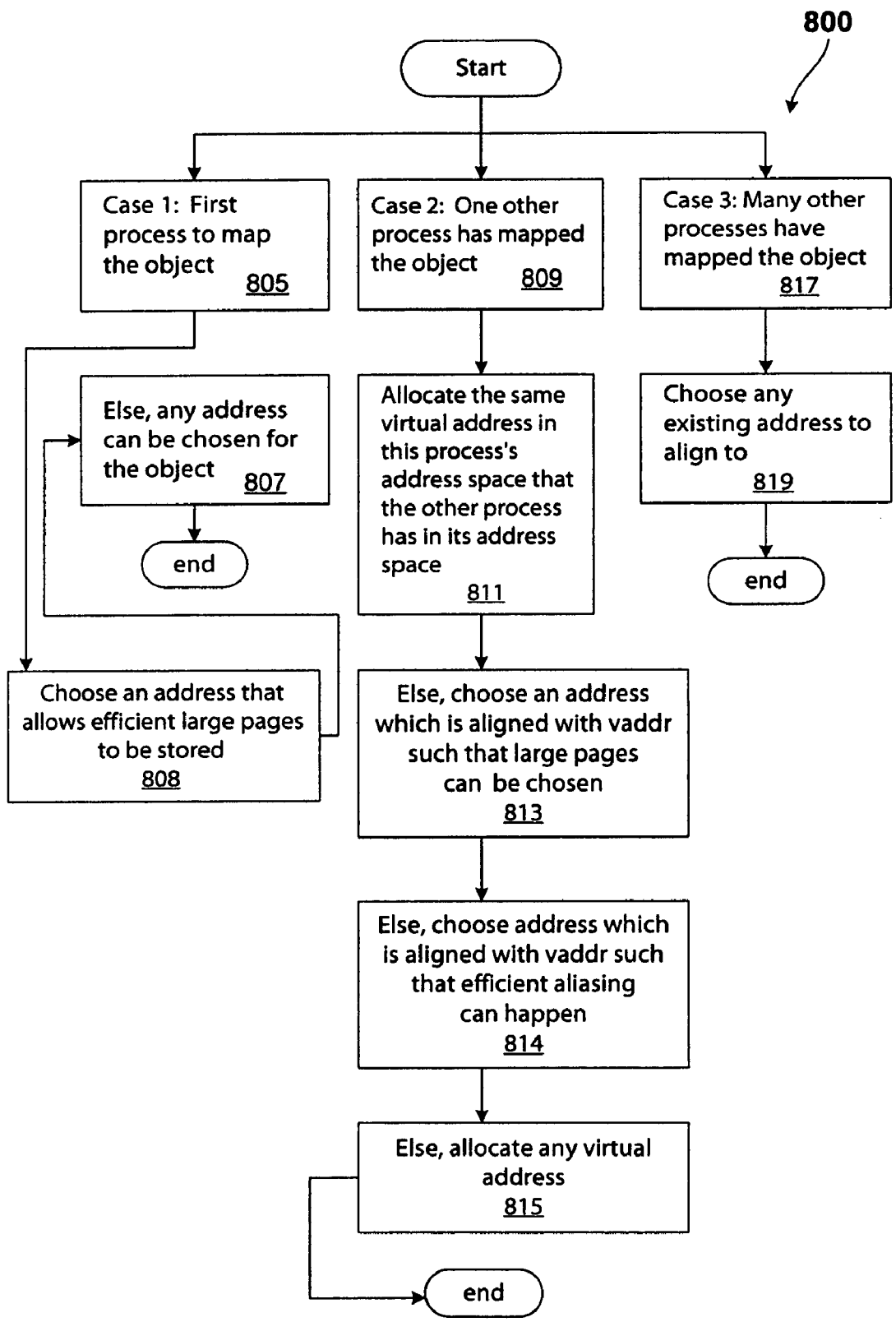
FIG. 8 is a flowchart illustrating a method of allocating address space for 32 bit MPAS processes, in accordance with an embodiment of the invention.

FIG. 8 is a flowchart illustrating a method 800 of allocating address space for 32 bit MPAS processes, in accordance with an embodiment of the invention. It is noted that the method in FIG. 8 is just one example technique for achieving efficiency in the mapping operation. The method 800 is an optional technique that can be used for efficient mapping of memory objects and is not intended to limit the scope of embodiments of the invention.

In a first case, a first process will map an object (step 805). The method 800 will choose a virtual address that allows efficient large pages (808) to be stored. Otherwise, the method 800 can choose (807) any suitable virtual address for storing the object.

In a second case, one other process has mapped the object in virtual memory (step 809). The method 800 will allocate the same virtual address in this second process's address space that the other process has in its address space. Otherwise, the method 800 will choose a virtual address which is aligned with vaddr (which is the other process's virtual address for the object), such that large pages can be chosen (step 813).

Otherwise, the method 800 will choose a virtual address which is aligned with vaddr, such that efficient aliasing can happen (step 814).

Otherwise, the method 800 will allocate any suitable virtual address (step 815).

In a third case, many other processes (or a plurality of processes) have mapped the object in virtual memory (step 817). The method 800 will choose any suitable existing virtual address to align to (step 819).

Figure 9:
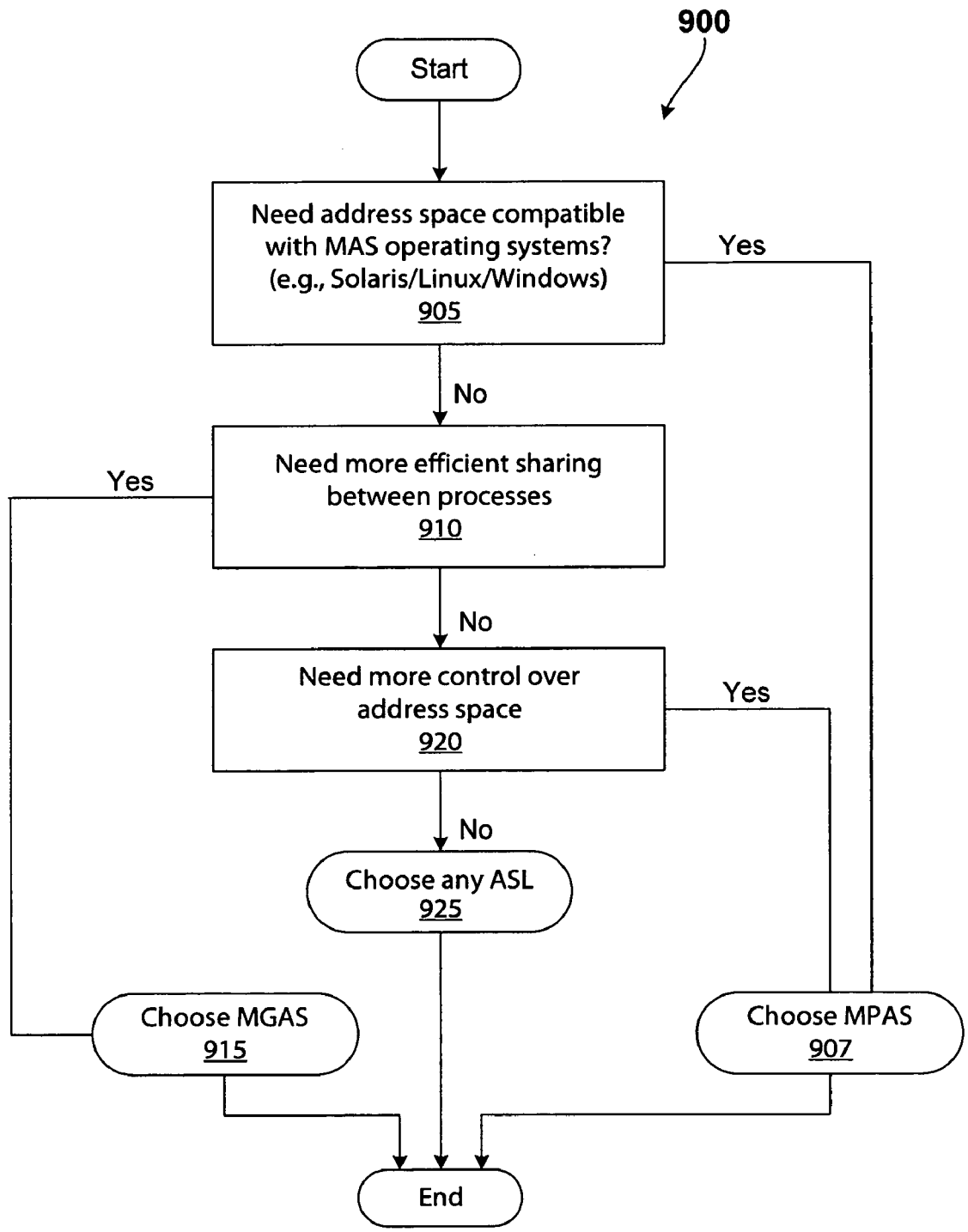
FIG. 9 is a flowchart illustrating a method of choosing the MGAS model or the MPAS model.

FIG. 9 is a flowchart illustrating a method 900 of choosing the MGAS model or the MPAS model by a software architect (application developer). As an example, the method 900 permits a software architect from one particular vendor (e.g., ORACLE CORPORATION) to write an application so that the application will run in a computer from another vendor (e.g., the HP-UX based architecture from HEWLETT-PACKARD COMPANY). As a result, the method 900 permits address space compatibility for applications. In step (905) of method 900, the software architect determines if there is a need for an address space that is compatible with the MAS (multiple address) operating systems. Examples of an MAS operating system are SOLARIS, LINUX, and WINDOWS. If there is a need for an address space that is compatible with the MAS, then the software architect will choose the MPAS model (step 907), and as a result, the application will see the layout in FIG. 4A if the application is a 32 bit application or will see the layout in FIG. 5A if the application is a 64 bit application. If there is not a need for an address space that is compatible with the MAS, then the software architect determines if there is a need for more efficient sharing between two or more processes, or more efficient sharing between a process and the file system (step 910). Efficient sharing between multiple processes, or between a process and a file system, leads to more speed in operation.

If there is a need for more efficient sharing between two or more processes, then the software architect will choose the MGAS model (step 915), and as a result, the application will see the layout in FIG. 6A if the application is a 32 bit application or will see the layout in FIG. 7 if the application is a 64 bit application. If there is not a need for more efficient sharing between two or more processes, then the software architect determines if there is a need for more control over the address space (and operating system). For example, some applications may require mapping of memory objects at particular addresses in order to prevent the failure of the process of the application. Some examples of applications that want to map objects at a fixed address are debuggers that would like to map objects at the same address that is specified in the coredump headers. Applications that need a fixed known address to map a shared object will probably fail because the address may have been used by another process.

If the software architect needs more control over the address space, then the software architect will choose the MPAS model in step (907). On the other hand, if the software architect does not need more control over the address space, then the software architect can choose any address space layout model in step (925). The method 900 then ends.

Recognizing an MPAS Binary

Since the system needs to execute both MPAS process and MGAS process concurrently, there is a need for a method to identify at the time a binary is executed, as to whether a binary needs to be run as an MPAS process or an MGAS process.

This method of determining whether the binary needs to run as an MPAS or MGAS process, is performed by the operating system 154 (FIG. 2).

Figure 10:
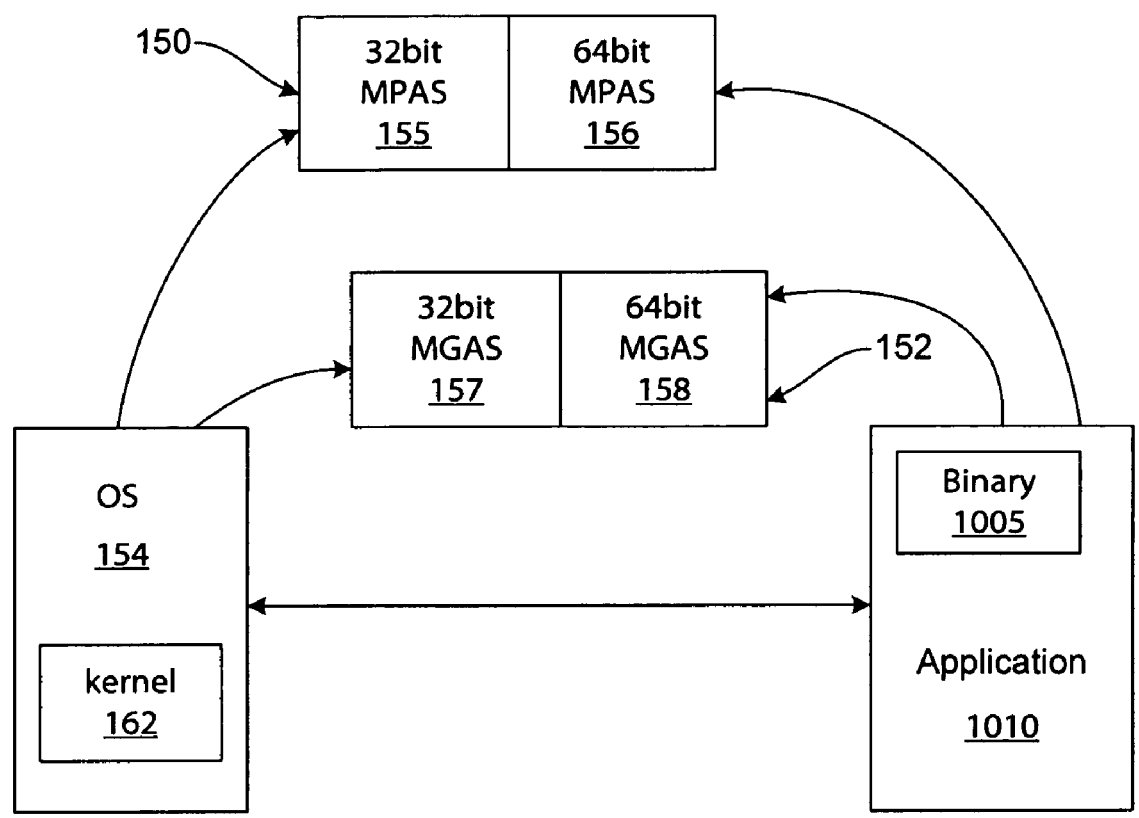
FIG. 10 is a block diagram illustrating a method of identifying if an application will run under the MGAS model or MPAS model.

Reference is now made to FIG. 10. In one example method, the software architect can set a notation in the binary 1005, which identifies the type of address space layout (MPAS or MGAS) that the binary desires. This notation can be made in the binary 1005 using tools like the linker, etc. The binary 1005 is included in an application 1010 that will be executed. The kernel 162 determine if the address space layout will be the MPAS model 150 (e.g., 32 bit MPAS model 155 or 64 bit MPAS model 156) or the MGAS model 152 (e.g., 32 bit MGAS model 157 or 64 bit MGAS model 158) by reading the notation in the binary 1005. The kernel 162 will partition the address space in memory, depending on which of the MPAS models 155 or 156 or MGAS models 157 or 158 is selected in the binary 1005 notation. The kernel 162 can then map the objects for the application 1010 in the appropriate address spaces in memory, as previously discussed above.

The global address space model for shared memory is the most efficient design for the PA-RISC (precision architecture-RISC) architecture because the PA-RISC architecture uses a virtually indexed cache and places severe restrictions on the use of address aliasing. The PA-RISC chip is used in minicomputers and workstations from, for example, HEWLETT-PACKARD COMPANY, Palo Alto, Calif.

In a single address space (SAS) OS model, every process that is mapping the same segment will receive the same address. In other words, the objects that are being shared have the same address across all process in the system.

In the multiple address space (MAS) OS model, a process that is mapping the same segment may have an address that is different from the address of another process that is sharing the same segment. Aliasing is used to permit sharing of that segment.

A Single Address Space OS (SAS OS) has the following advantages when compared to a Multiple Address Space OS (MAS OS):

1. The SAS OS permits a more efficient use of the Translation Lookaside Buffer (TLB). A TLB is a table used in a virtual memory system and lists the physical address associated with each virtual address. A shared memory page in a SAS OS will have only one entry in TLB for all processes sharing that page. A shared memory page in a MAS OS will have one TLB entry per process that shares the page. Since TLB is a scarce resource, the SAS OS uses the TLB more efficiently.

2. The SAS OS is best suited for a virtual index cache. In an SAS OS, all processes use the same virtual address and thus all the processes share the same cache line. In an MAS OS with virtually indexed cache, many cache lines will be used for the same memory location. In addition, there will be additional complexity needed in the cache controller to provide coherency.

3. Large pages can be implemented efficiently by use of the SAS OS. Since all processes that share a memory segment use the same virtual address, every process will use the same large page. If aliasing is used to share memory (as in the MAS OS), the addresses may not be aligned. This may add more than one translation for each large page.

4. By use of the SAS OS, the number of faults is independent of the number of processes that share the memory segment. If two processes share the same page, the first process that faults will add the translation and the second process will use the same translation and avoid generating a fault. In an MAS OS, each process will incur a fault to add the translation.

A Single Address Space OS typically has the following disadvantages when compared to a Multiple Address Space OS:

1. The amount of shared address space is limited for 32 bit applications. On the HP-UX architecture from Hewlett-Packard Corporation, Palo Alto, Calif., the shared address space is limited to 2 GB for all 32 bit applications in the system. This is inadequate today when many systems have several Gigabytes of physical memory. This problem can be solved by migrating the application to 64 bit but a large number of applications will remain as 32 bit due to the cost of migration.

2. The address space of each process is segmented. The HP-UX architecture has four segments. One segment each is used for text and private objects (data, stack, private mmf (mail message file) objects) and two segments for shared objects. Therefore, there is a waste of address space in very sparsely populated segments.

3. Applications that want to map objects at a fixed address will probably fail.

4. Same process mapping of an object more than once is not allowed.

5. There is a need for protection keys to prevent illegal accesses. If a process has many shared segments, then this could cause protection key thrashing since there are only 8 protection key registers.

In summary, a single address space OS (SAS OS), such as HP-UX, provides the best performance compared to a multiple address space OS (MAS OS) but is less flexible.

The first three disadvantages of a single address space OS are described in detail below:

Limited Shared Address Space—Processes that want to use shared memory will be assigned the same unique address. All global addresses are allocated from a global pool. For 32 bit applications, the global address space is limited to a maximum of 2 GB. This 2 GB limit is for the whole system and not per process. As a result, the amount of shared memory available for a process depends on the amount used by other processes in the system. For example, if a process uses 1 GB of shared memory, then another process cannot use more than 1 GB of shared space. In a Multiple Address Space OS, each 32 bit process can theoretically have 4 GB of shared space. The 32 bit model is still the most popular programming model. Migrating to 64 bit is very expensive for many software vendors and most do not have a need to migrate. Applications that do not have virtual address pressure (on Solaris, Linux, etc.) have no motivation to migrate their applications to a 64 bit model.

The limited address space on a SAS OS has been a severe restriction for 32 bit applications. Various attempts have been made to alleviate this problem by implementing memory windows and SHMEM_GIC executables. Both these solutions impose restrictions and require Independent Software Vendors to have an understanding of the address space layout. For example, in memory windows, if a process maps a shared memory segment in its window, another process that does not belong to the memory window cannot share the same shared memory segment.

Segmented Address Space Layout—On the PA-RISC architecture, the virtual address space of the process is segmented into four quadrants of 1 GB each for 32 bit processes and 4 exabytes each for 64 bit processes. One quadrant is used for text, one quadrant for private data, and two quadrants for shared memory. Because it is segmented, the boundaries are not flexible. For a 32 bit application, 1 GB of the virtual address space is allocated for text even though the actual text size for the application is only a few kilobytes. This also limits the data to 1 GB. Again, attempts have been made in HP-UX to alleviate this problem by implementing EXEC_MAGIC executables. Similarly, on Intel's Itanium architecture, the virtual address space is segmented into 8 octants. This invention does not rely on the virtual address space being segmented. Embodiments of this invention could use segmentation to implement it. In the description above, it is assumed that such segmentation is being used.

Embodiments of the invention permits an application developer to decide the address space model to be supported by an operating system on a computer and to overcome the above constraints of the address space model.

The method of certain embodiments of the invention may typically be implemented in hardware, software, firmware, or a combination thereof. In one embodiment, the method is executed by software or firmware that is stored in a memory and that is executed by a suitable instruction execution system. If implemented in hardware, as in an alternative embodiment, the method can be implemented with any suitable technology that is well known in the art.

The various engines or modules discussed herein may be, for example, software, commands, data files, programs, code, modules, instructions, or the like, and may also include suitable mechanisms.

Reference throughout this specification to "one embodiment", "an embodiment", or "a specific embodiment" means that a particular feature, structure, or characteristic described in connection with the embodiment is included in at least one embodiment of the present invention. Thus, the appearances of the phrases "in one embodiment", "in an embodiment", or "in a specific embodiment" in various places throughout this specification are not necessarily all referring to the same embodiment. Furthermore, the particular features, structures, or characteristics may be combined in any suitable manner in one or more embodiments.

Other variations and modifications of the above-described embodiments and methods are possible in light of the foregoing disclosure. Further, at least some of the components of an embodiment of the invention may be implemented by using a programmed general purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

It is also within the scope of an embodiment of the present invention to implement a program or code that can be stored in a machine-readable medium to permit a computer to perform any of the methods described above.

Additionally, the signal arrows in the drawings/Figures are considered as exemplary and are not limiting, unless otherwise specifically noted. Furthermore, the term "or" as used in this disclosure is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

It is also noted that the various functions, variables, or other parameters shown in the drawings and discussed in the text have been given particular names for purposes of identification. However, the function names, variable names, or other parameter names are only provided as some possible examples to identify the functions, variables, or other parameters. Other function names, variable names, or parameter names may be used to identify the functions, variables, or parameters shown in the drawings and discussed in the text.

While the present invention has been described herein with reference to particular embodiments thereof, a latitude of modification, various changes and substitutions are intended in the foregoing disclosures, and it will be appreciated that in some instances some features of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular embodiment disclosed as the best mode contemplated for carrying out this invention, but that the invention will include all embodiments and equivalents falling within the scope of the appended claims.

What is claimed is:

1. A computer-implemented method to permit an application developer to decide the address space model to be supported by an operating system on a computer, the method comprising:
    selecting, by an operating system, one of a mostly private address space (MPAS) model and a mostly global address space (MGAS) model, where if the MPAS model is selected, then a process is permitted to map a shared object in a mostly private address space (MPAS) layout so that the process perceives a behavior as if the process is running on a multiple address space operating system, and where if the MGAS model is selected, then the process is permitted to map a shared object in a mostly global address space (MGAS) layout so that the process perceives a behavior as if the process is running on a single address space operating system.

2. The computer-implemented method of claim 1, wherein the selected MPAS model or MGAS model is indicated in a binary in an application.

3. The computer-implemented method of claim 2, wherein a kernel of the operating system reads the binary to determine if support will be provided for the MPAS model or the MGAS model.

4. The computer-implemented method of claim 1, wherein the MPAS layout comprises one of a 32 bit MPAS layout and a 64 bit MPAS layout.

5. The computer-implemented method of claim 4, wherein the 32 bit MPAS layout comprises private address spaces.

6. The computer-implemented method of claim 4, wherein the 64 bit MPAS layout comprises private address spaces and a shared address space.

7. The computer-implemented method of claim 1, wherein the MGAS layout comprises one of a 32 MGAS layout and a 64 bit MGAS layout.

8. The computer-implemented method of claim 7, wherein the 32 MGAS layout comprises shared address spaces and a private address space.

9. The computer-implemented method of claim 7, wherein the 64 bit MGAS layout comprises shared address spaces and private address spaces.

10. The computer-implemented method of claim 1, wherein the MPAS layout and the MGAS layout is partitioned in memory by a kernel of the operating system.

11. The computer-implemented method of claim 1, further comprising:
    managing a hash page table, where a least recently used (LRU) algorithm is used to remove inactive or least recently used translations from the hash page table.

12. The computer-implemented method of claim 1, further comprising:
    allocating a virtual address space for a 32 MPAS process by a method comprising:
    mapping, by a process, an object to a first virtual address that allows efficient large pages to be stored; and
    if the first virtual address is not available, then mapping the object to any virtual address.

13. The computer-implemented method of claim 1, further comprising:
    (a) if a first process has mapped an object in virtual memory, then allocating a same virtual address in an address space of a second process, where the same virtual address is in an address space of the first process;
    (b) if step (a) is not possible, then choosing a second virtual address that is aligned with (vaddr) which is the virtual address for the object for the first process;
    (c) if step (b) is not possible, then choosing a third virtual address which is aligned with vaddr such that large pages can be chosen;
    (d) if step (c) is not possible, then choosing a fourth virtual address which is aligned with vaddr such that efficient aliasing is permitted; and
    (e) if step (d) is not possible, then choosing any suitable virtual address.

14. The computer-implemented method of claim 1, further comprising:
    if a plurality of processes have mapped an object in virtual memory, then allocating any suitable existing virtual address to align.

15. A computer system to permit an application developer to decide the address space model to be supported by an operating system on a computer, the computer comprising: comprising:
    a processor; and
    an operating system that can be executed by the processor, where the operating system is configured to select one of a mostly private address space (MPAS) model and a mostly global address space (MGAS) model, where if the MPAS model is selected, then a process is permitted to map a shared object in a mostly private address space (MPAS) layout so that the process perceives a behavior as if the process is running on a multiple address space operating system, and where if the MGAS model is selected, then the process is permitted to map a shared object in a mostly global address space (MGAS) layout so that the process perceives a behavior as if the process is running on a single address space operating system.

16. The apparatus of claim 15, wherein the selected MPAS model or MGAS model is indicated in a binary in an application.

17. The apparatus of claim 16, wherein a kernel of the operating system reads the binary to determine if support will be provided for the MPAS model or the MGAS model.

18. The apparatus of claim 15, wherein the MPAS layout comprises one of a 32 MPAS layout and a 64 bit MPAS layout.

19. The apparatus of claim 18, wherein the 32 MPAS layout comprises private address spaces.

20. The apparatus of claim 18, wherein the 64 bit MPAS layout comprises private address spaces and a shared address space.

21. The apparatus of claim 15, wherein the MGAS layout comprises one of a 32 MGAS layout and a 64 bit MGAS layout.

22. The apparatus of claim 21, wherein the 32 MGAS layout comprises shared address spaces and a private address space.

23. The apparatus of claim 21, wherein the 64 bit MGAS layout comprises shared address spaces and private address spaces.

24. The apparatus of claim 15, wherein the MPAS layout and the MGAS layout is partitioned in memory by a kernel of the operating system.

25. An apparatus to permit an application developer to decide the address space model to be supported by an operating system on a computer, the apparatus comprising:

means for permitting a process to map a shared object in a mostly private address space (MPAS) layout so that the process perceives a behavior as if the process is running on a multiple address space operating system if a MPAS model, and for permitting the process to map a shared object in a mostly global address space (MGAS) layout so that the process perceives a behavior as if the process is running on a single address space operating system if a MGAS model is selected.

26. An article of manufacture, comprising:

a machine-readable medium having stored thereon instructions to:

permit a process to map a shared object in a mostly private address space (MPAS) layout so that the process perceives a behavior as if the process is running on a multiple address space operating system if a MPAS model, and to permit the process to map a shared object in a mostly global address space (MGAS) layout so that the process perceives a behavior as if the process is running on a single address space operating system if a MGAS model is selected.

* * * * *

UNITED STATES PATENT AND TRADEMARK OFFICE
CERTIFICATE OF CORRECTION

PATENT NO.           : 7,149,873 B2                                            Page 1 of 1
APPLICATION NO. : 10/692981
DATED                  : December 12, 2006
INVENTOR(S)         : Saleem Mohideen et al.

It is certified that error appears in the above-identified patent and that said Letters Patent is hereby corrected as shown below:

In column 1, line 12, delete "acre" and insert -- are --, therefor.

In column 18, line 11, in Claim 7, delete "32" and insert -- 32 bit --, therefor.

In column 18, line 14, in Claim 8, delete "32" and insert -- 32 bit --, therefor.

In column 18, line 29, in Claim 12, delete "32" and insert -- 32 bit --, therefor.

In column 18, lines 60-61, in Claim 15, after "computer comprising:" delete "comprising:".

In column 19, line 16, in Claim 18, delete "32" and insert -- 32 bit --, therefor.

In column 19, line 18, in Claim 19, delete "32" and insert -- 32 bit --, therefor.

In column 19, line 24, in Claim 21, delete "32" and insert -- 32 bit -- therefor.

In column 19, line 26, in Claim 22, delete "32" and insert -- 32 bit --, therefor.

Signed and Sealed this

Twenty-third Day of June, 2009

JOHN DOLL
*Acting Director of the United States Patent and Trademark Office*